(12) United States Patent
Calvani

(10) Patent No.: US 6,588,075 B2
(45) Date of Patent: Jul. 8, 2003

(54) FISH-HOOK CLASP WITH A DOUBLE ACTIVATION MECHANISM

(76) Inventor: Enio Calvani, 74, Via Vecchia Romana, Frz. Ponticino, Laterina, Arezzo (IT), I-52020

( * ) Notice: Subject to any disclaimer, the term of this patent is extended or adjusted under 35 U.S.C. 154(b) by 0 days.

(21) Appl. No.: 10/028,441

(22) Filed: Dec. 28, 2001

(65) Prior Publication Data

US 2002/0166215 A1 Nov. 14, 2002

(30) Foreign Application Priority Data

May 10, 2001 (IT) .................................... AR2001A0010

(51) Int. Cl.[7] ........................ A01K 91/04; A44B 13/02; F16B 45/02
(52) U.S. Cl. .................... 24/599.4; 24/599.5; 24/599.6; 24/600.9; 24/908; 43/42.49; 43/44.83
(58) Field of Search ............................ 24/599.4, 599.5, 24/599.6, 599.8, 607, 600.9, 908; 43/42.49, 44.83

(56) References Cited

U.S. PATENT DOCUMENTS

| | | | | |
|---|---|---|---|---|
| 559,640 A | * | 5/1896 | Walker ....................... 24/599.4 |
| 1,879,167 A | * | 9/1932 | Freysinger .................. 24/599.4 |
| 4,062,092 A | * | 12/1977 | Tamada et al. ............. 24/599.5 |
| 4,340,999 A | | 7/1982 | Chini | |
| 4,679,280 A | * | 7/1987 | Krahenbuhl ................ 24/599.4 |
| 5,117,539 A | | 6/1992 | Shrader et al. | |
| 5,479,795 A | | 1/1996 | Neri | |
| 5,832,571 A | * | 11/1998 | Kanamori ................... 24/599.6 |
| 6,161,264 A | * | 12/2000 | Choate ....................... 24/599.5 |
| 6,438,809 B1 | * | 8/2002 | Camaiani .................... 24/599.4 |

FOREIGN PATENT DOCUMENTS

FI 99U000116 9/1999

* cited by examiner

*Primary Examiner*—Victor Sakran
(74) *Attorney, Agent, or Firm*—Young & Thompson

(57) ABSTRACT

A fish-hook clasp with a rotating mechanism or "small jack" whose shape forms two activating wings which protrude respectively from the side edges of the clasp's shell. It is possible to act on at least one of the wings to cause the rotating mechanism to rotate therefore bringing the rotating mechanism from the closed position, towards which the rotating mechanism is normally pushed by the internal spring, to the open position. The rotating mechanism is also supplied with contact surfaces, which are there to interact with the closed part of the edge of the shell of the clasp which defines the position of an arm of the rotating mechanism when the clasp is in the closed position.

10 Claims, 1 Drawing Sheet

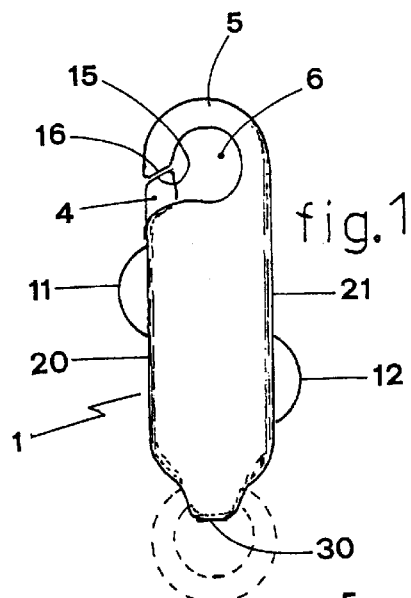
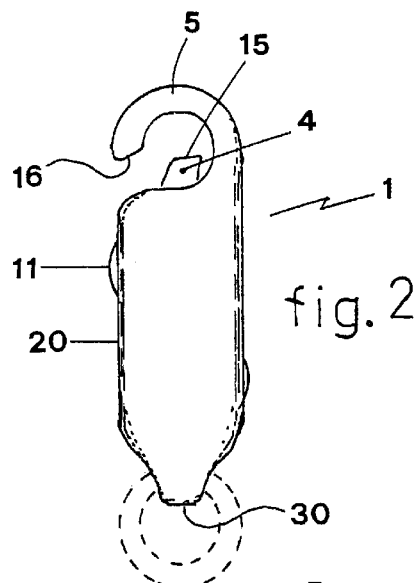
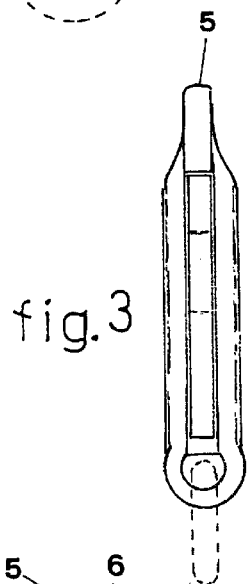
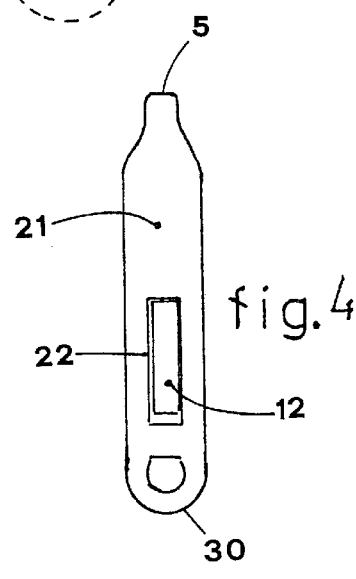
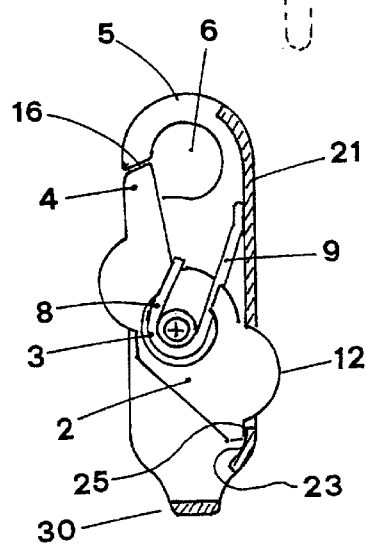
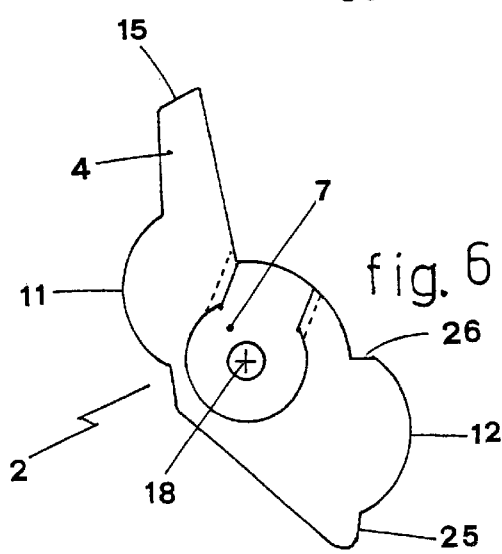

FISH-HOOK CLASP WITH A DOUBLE ACTIVATION MECHANISM

BACKGROUND OF THE INVENTION

The invention consists of a fish-hook type clasp with a double activation mechanism, indicated for use on ornamental necklaces and bracelets, and it is specially made for the gold and silver jewellery industry as well as for costume jewellery in general.

There are prior art fish-hook type clasps, which are equipped on one end with means for a permanent connection to one end of the chain to which they are joined; on the other end they are shaped like an openable ring through which the free end of the chain forming the necklace, the bracelet or other similar item, is joined.

The activating mechanism is placed on one of the side edges of the clasp, by acting on it the openable ring is brought from the closed position, to which the internal spring constantly pushes it, to the open position.

The activating mechanism is usually shaped like a minuscule protruding lever or wing which is normally pulled with a finger nail, considering its size, to obtain the rotation of the rotating mechanism or "small jack" and consequently the opening of the joining openable ring.

Apart from this well known solution, another fish-hook type clasp, the object of Italian Patent No. 478,185, filed on Jan. 18, 1979 (corresponding to U.S. Pat. No. 4,340,999), is known, in which the containing shell has an inward flare along its side edge. The rotating lever can be pressed with a fingernail through said flare, the free end of said lever, under the action of an internal spring, interacts with the free end of a corresponding structure shaped like a hook. Through said compression the rotating lever is pushed towards the position in which the hooking ring is in the open position.

A second prior art practical solution, the object of Italian Patent No. 1,266,962 of Apr. 24, 1993 (corresponding to U.S. Pat. No. 5,479,795), consists of a containing shell combined with a strip that forms the joining cavity of the clasp. Said parts are joined by a screw or soldered together. They are equipped with a cavity in which to house a small diamond whose hold acts as the pivoting rod of the rotating mechanism. Said mechanism is formed by a lever with a side protrusion on which to operate the compression to control the rotation and move the free end to the position in which the hooking ring is open.

A third solution, the object of U.S. Pat. No. 5,117,539 filed on Sep. 3, 1991, foresees an S-shaped rotating element or "small jack", on one end shaped like a straight arm which is designed to interact with the hook shaped fixed structure which originates the openable ring, on the other end it is provided with a shape which protrudes from a side edge of the shell. Said shape originates the point on which the rotation of the "small jack" is determined towards the open position by means of a compressing action.

A fourth solution, the object of the Italian Utility Model Application No. FI99U000116 of Sep. 29, 1999 foresees an external shell provided on one end with two expansions and the rotating mechanism equipped with a hook shaped arm, which is made to join them, to originate the openable ring of the clasp. The rotating mechanism is also provided with a protruding part on which to act to obtain its rotation and consequently that of the hook shaped arm, in order to move the clasp from the closed state, in which it is constantly pushed by the internal spring, to the open position.

A fifth solution, the object of the Italian Patent Application No. AR2000A0045 of Oct. 6, 2000 (corresponding to U.S. patent application Ser. No. 09/782,058), foresees in it the rotating component or "small jack" characterized by an activating protrusion shaped like a button, placed next to the straight arm of the rotating mechanism which closes the corresponding hook shaped fixed arm which forms the openable ring.

Therefore prior art clasps are all provided with a rotating mechanism equipped with an activating protrusion shaped like a tab or button the activation of which will cause the opening of the clasp. The rotating mechanism therefore protrudes from one of the two side edges of the fish hook clasp. Since the protruding side of the rotating mechanism is usually activated with a thumb, the closing mechanism should be placed in a position easily reachable with it. In some cases, as when the clasp is mounted on necklaces, it is not visible. The activation of the closing device occurs by attempts which is clearly an inconvenience.

Another disadvantage in prior art industrially made clasps, where each clasp is not checked after assembly, is to have the closing arm of the "small jack" in a position which does not always match precisely the fixed hook shaped arm it faces to define the closed state of the clasp. Said result is the consequence of a variation, even if minimal, of the hinging point of the "small jack" in the containing shell in which it is lodged. Said imperfect position makes the clasp aesthetically unattractive and not secure.

SUMMARY OF THE INVENTION

The aim of the present invention is to make a fish-hook clasp that can be operated by the fingers of the user's hand independently from how it is held, therefore independently from the fact that the side edge which originates the hook shaped arm of the openable ring is or not oriented towards the activating thumb or the index finger of the same hand.

Another aim is to make an industrial type clasp in which the rotating mechanism and the containing shell can be coupled with relatively ample tolerances without having the end of the straight arm emerging from the "small jack" and the end of the hook-shaped arm necessarily far from the foreseen position in which they are perfectly facing each other. In this way a uniform industrial production is guaranteed, by eliminating functional and aesthetic defects.

The invention that has allowed to obtain said results consists in a fish-hook type clasp with a rotating mechanism or "small jack", whose shape originates two activating wings that protrude from both side edges of the clasp's shell. By acting on at least one of the two activating wings the rotation of the rotating mechanism is carried out to move it from the closed position, to which it is constantly pushed by the internal spring, to the open position. Said rotating mechanism is also equipped with contact surfaces which interact with at least one closed side of a side edge on the clasp's shell and are such as to define for it the position to which the closed state of the same clasp corresponds.

This type of clasp is advantageous in that the opening can be obtained by acting on one or both of the two protruding wings, without requiring the clasp to be in a specific position in the user's hands. One more advantage of said clasp is due to the fact that it can be held on the sides between the thumb and index fingers of one hand, in different positions. Therefore it can either be held next to the openable ring or next to the permanently closed ring or in points in between, these positions allowing to push at least one of the two activating wings with the fingers, to cause the rotation of the rotating mechanism and consequently the opening of the clasp. Finally, another advantage is due to the fact that the shape of the rotating mechanism with contact surfaces on the points that correspond to the closed edge of the containing shell makes it easier for the rotating mechanism or "small jack" to be precisely positioned in respect to the same fixed containing shell, therefore granting a higher tolerance when the two components are joined which is the most delicate and complex of the steps.

BRIEF DESCRIPTION OF THE DRAWINGS

Said clasp is described in detail herebelow with the aid of exemplifying drawings showing the preferred embodiment, in which:

FIG. 1 is a front view of the clasp in its closed state;

FIG. 2 is the front view of the clasp of FIG. 1, in the open state;

FIG. 3 is the side view of the clasp which highlights the open side edge;

FIG. 4 is the side view of the clasp which highlights the partially close side edge;

FIG. 5 is the front view of the clasp where the containing shell has been partially removed to show the internal mechanism;

FIG. 6 is the enlarged front view of the internal "small jack".

It is understood that the drawings are simply exemplifying to facilitate the understanding of the invention, without in any way becoming a limitation.

DESCRIPTION OF THE PREFERRED EMBODIMENT

In substance said clasp consists in the combination of a containing shell 1, of a rotating mechanism or "small jack" 2 and of the internal spring 3, which is appropriate to constantly push rotating mechanism 2 to the closed position, therefore to the state in which the lever arm 4 of said rotating mechanism 2 takes on the position in which it becomes the continuation of curved arm 5 of containing shell 1, to form the openable joining ring 6 of the clasp.

Rotating mechanism 2 is equipped with impression 7 destined to house the central part of spring 3, while its arms 8 and 9, one of which interacts with the same rotating mechanism 2 and the other with the containing shell 1, constantly push the rotating mechanism towards the closed position.

Said rotating mechanism 2 can have one or two rotating protrusions. In this case the facing surfaces of the containing shell have corresponding impressions which are appropriate to engage the position of the rotating mechanism 2 and its rotation. In another concrete solution the coupling of said rotating mechanism 2 with containing shell 1 occurs by means of a specific stud with which the reciprocal positions of the clasp components are defined. In its profile, the rotating mechanism or "small jack" 2 is characterized by the two protrusions or activating wings 11 and 12, which are made to emerge from both side edges 20 and 21 of the containing shell 1 of the clasp. Said wings 11 and 12 can be activated, which means that one or the other or both can be pushed to cause the rotation of mechanism 2 of which they are part and to bring the clasp from the closed state, as shown in FIG. 1, to the open state, as shown in FIG. 2, through the thrust of internal spring 3.

The rotating mechanism or "small jack" 2 has been shaped to allow one portion of its border to interact with the corresponding portion of closed side edge 21 of containing shell 1. In this way the closed position of rotating mechanism 1 is defined, without tying said state to the interaction of ends 15 and 16, respectively of the almost straight arm 4 of "small jack" 2 and of curved arm 5 of containing shell 1.

Rotating mechanism 2 has an oblong shape, and its rotation fulcrum 18 is placed towards its center. Its protruding activating wings 11 and 12 are in almost symmetrical position in respect to said fulcrum 18, one is made to protrude from side edge 20, the other one from side edge 21 of the containing shell of the clasp.

Said containing shell 1 is characterized by the fact that its side 20 is completely open while side edge 21 is partially closed, with at least opening 22 appropriate for protruding wing 12, which activates the "small jack", to emerge. Side edge 21 is partially closed in order to increase the resistance to deformation of containing shell 1. When said shell is produced through shearing and bending, it then undergoes saudering on side edge 21. At least portion 23 of back 21 (see FIG. 5), is made to interact with rotating mechanism 2, in correspondence with its tab 25, in order to define the closed position.

It is advantageous for said tab 25 to be far from end 16 of curved arm 5, so that a variation or movement of the rotation axis of rotating mechanism 2, when it couples with containing shell 1, will determine a minimum variation of the angular rotation which brings tab 25 in contact with surface 23. In this way there is a corresponding minimal variation of reciprocal positions of surfaces 15 and 16. Arm 4 will always appear in line with or in the same position as curved arm 5, even when, due to manufacturing tolerances, there are small variations of axis 18 on which mechanism 2 rotates.

Rotating mechanism 2 has tab 25, which is made to interact with segment 23 of back 21 of shell 1 through which the closed position of the clasp is defined, in a position which is almost diametrically opposite to that of arm 4 in respect to fulchrum 18 and in a position far from it.

In the graphic representation rotating mechanism 2 has tab 25 and tab 26 which is also made to interact with side edge 21 when said rotation mechanism 2 is in the closed position.

When manufacturing the clasp the outer profile of the clasp and its components can undergo ample variations as long as its functional logic and its field of protection, as defined in the following claims, are maintained.

What is claimed is:

1. A fish-hook clasp with a double activation mechanism, comprising:
    a containing shell;
    a rotating mechanism or "small jack" having a profile with two protruding activating wings that emerge from side edges of the containing shell, at least one of said protruding activating wings being compressible to provoke the passage from a closed position to an open position of the rotating mechanism,
    wherein said rotating mechanism or "small jack" has an oblong shape and has a rotation fulcrum that is towards a center of said rotating mechanism, said protruding activating wings being in almost symmetrical positions with respect to said fulcrum, and
    wherein one of said protruding activating wings protrudes from one of said side edges, and another one of said activating wings protrudes from another one of said side edges.

2. The clasp, as claimed in claim 1, wherein at least one segment of said profile is shaped so as to interact with a corresponding segment of the closed side edge of the containing shell of the clasp when the "small jack" is in the closed state.

3. The clasp, as claimed in claim 1, wherein said one of the side edges is completely open, the other one of the sided edges is partially closed, with at least one opening for one of the activation wings of the "small jack" to protrude from the at least one opening.

4. The clasp, as claimed in claim 1, wherein one segment of said closed side edge is made to interact with the rotating mechanism to define the closed position.

5. The clasp, as claimed in claim 4, wherein the rotating mechanism or "small jack" has a tab on its profile, said tab is made to interact with the segment of the side edge of the containing shell so as to define the closed position of the clasp, with said tab in a position which is almost diametrically opposite to an arm of the rotating mechanism with respect to the rotation fulcrum and in a position that is away from said arm.

6. The fish-hook clasp with double activation mechanism as claimed in claim 1, wherein the two protruding activating wings have a substantially round shape.

7. The fish-hook clasp with double activation mechanism as claimed in claim 6, wherein said two protruding wings penetrate into the containing shell when the clasp is in the open position.

8. The fish-hook clasp with double activation mechanism as claimed in claim 1, wherein the clasp is movable from the closed position to the open position by pushing any one of the two protruding wings.

9. The fish-hook clasp with double activation mechanism as claimed in claim 1, wherein the clasp is movable from the closed position to the open position by pushing both the protruding wings.

10. A fish-hook clasp with a double activation mechanism, comprising:
   a containing shell with one end shaped like a hook and another end provided with a joining point;
   a rotating mechanism or "small jack" that is hinged within the containing shell and is provided with an arm interacting with the hook-shaped end of said containing shell when the clasp is in a closed position; and
   an internal spring that constantly pushes said rotating mechanism towards the closed position,
   wherein the rotating mechanism or "small jack" has an oblong shape, a rotation fulcrum at a center of the rotating mechanism, and two protruding activating wings in almost symmetrical positions with respect to said fulcrum, one of said activating wings is made to protrude from one side edge of said shell and another one of said activating wings emerges from another side edge of the containing shell in order to undergo a compression when the clasp moves from the closed position to an open position.

* * * * *